United States Patent
Dougherty

(10) Patent No.: US 12,306,077 B1
(45) Date of Patent: May 20, 2025

(54) APPARATUS AND METHOD FOR THE MEASUREMENT OF DISSOLVED AND ENTRAINED GAS PHASE IN A LIQUID

(71) Applicant: Steven John Dougherty, Eagle, ID (US)

(72) Inventor: Steven John Dougherty, Eagle, ID (US)

( * ) Notice: Subject to any disclaimer, the term of this patent is extended or adjusted under 35 U.S.C. 154(b) by 321 days.

(21) Appl. No.: 17/937,168

(22) Filed: Sep. 30, 2022

(51) Int. Cl.
*G01N 1/20* (2006.01)
*G01N 15/00* (2006.01)

(52) U.S. Cl.
CPC ............ *G01N 1/2042* (2013.01); *G01N 15/00* (2013.01); *G01N 2001/2057* (2013.01); *G01N 2015/0011* (2013.01)

(58) Field of Classification Search
CPC ................. G01N 1/2042; G01N 15/00; G01N 2001/2057; G01N 2015/0011
See application file for complete search history.

(56) References Cited

U.S. PATENT DOCUMENTS

| | | | |
|---|---|---|---|
| 2,138,141 A | 11/1938 | Sylvan et al. | |
| 3,731,530 A | 5/1973 | Tanguy et al. | |
| 4,164,137 A * | 8/1979 | Williamson | G01N 35/1095 73/19.1 |
| 4,329,869 A * | 5/1982 | Toda | G01N 33/442 73/19.1 |
| 4,700,561 A | 10/1987 | Dougherty | |
| 4,862,729 A * | 9/1989 | Toda | G01N 7/14 73/19.1 |
| 5,442,948 A | 8/1995 | Cowing | |
| 5,932,792 A * | 8/1999 | Dougherty | G01N 7/00 73/19.01 |
| 6,125,688 A | 10/2000 | Matula | |
| 6,450,006 B1 * | 9/2002 | Dougherty | G01N 7/14 73/19.01 |

OTHER PUBLICATIONS

Steve Doughtery. DualAir S_V4. PAPEC. 2021. https://www.papec.com/squeezer-dualair.

* cited by examiner

*Primary Examiner* — Justin N Olamit

(57) ABSTRACT

Piston and cylinder apparatus for determining dissolved and entrained gas content of a liquid comprising: two conterminal and axially-aligned cylinders of different diameters; a first piston contained in the larger cylinder and a second piston of diameter less than the smaller cylinder axially placed within the first piston; movement of first piston and closure of isolation valves to isolate liquid sample in the smaller cylinder; extension of second piston into smaller cylinder to compress and determine entrained gas in the liquid; retraction of first and second pistons to apply vacuum to the isolated sample thereby releasing dissolved gas; extension of first piston to isolate liquid sample and released gas in the smaller cylinder; extension of second piston into smaller cylinder to compress and determine the total volume of gas; calculation of the dissolved gas from the difference between total gas and entrained gas.

8 Claims, 6 Drawing Sheets

APPARATUS AND METHOD FOR THE MEASUREMENT OF DISSOLVED AND ENTRAINED GAS PHASE IN A LIQUID

RELATED APPLICATIONS

This application claims the benefit of U.S. Provisional Patent Application Ser. No. 63/252,033 filed on Oct. 4, 2021, which is incorporated by reference herein.

FIELD OF THE INVENTION

The invention relates generally to the measurement of the amount of gas phase dissolved and entrained in a liquid phase.

BACKGROUND

Prior art describes various piston and cylinder apparatus and methods used to determine the content of compressible gas entrained within incompressible liquids. The piston and cylinder geometry can be used to expand or compress the mixture, thereby providing pressure and volume changes which can be used to calculate the volume of the compressible entrained gas phase. Additional prior art describes various combinations of piston and cylinder apparatus and methods for the measurement of dissolved gas in a liquid first by release of the dissolved gas into free gas phase by means of applied vacuum, followed by determination of the amount of released free gas by the measurement of the compressive properties of the gas-liquid mixture, thereby providing a measure of the volume of dissolved gas contained in the liquid at the outset.

Cromer, et, al, U.S. Pat. No. 2,138,141 (1938), described a piston and cylinder apparatus for the measurement of entrained gas dispersed within incompressible fluid, comprising isolation of a mixture of gas and fluid in a cylindrical vessel, compression of the isolated mixture with a piston (referred to as a "plunger"), measurement of the resultant volume change, measurement of the pressure change with a diaphragm-isolated pressure transducer, and calculation of the gas-phase content with thermodynamic gas laws. The Cromer apparatus and method have provided a basis for development of various piston and cylinder apparatus and methods which can use compression, expansion, or combinations of both, to measure the volume of entrained gas in an incompressible liquid. Some of these apparatus and methods also provide functionality which can apply vacuum to cause release of dissolved gas from liquids, followed by the determination of the total entrained gas by compressibility of the gas phase.

Cowing, U.S. Pat. No. 5,442,948 (1995), modified Cromer's "plunger" to a moveable, liquid-sealed piston in the cylinder, thereby allowing retraction of the piston to apply a vacuum to the isolated liquid sample, resulting in the liberation of dissolved gasses. This is followed by extension of the piston to compress the released gas, thereby allowing determination of the amount of gas which was initially dissolved in the liquid. The Cowing apparatus fails to provide best results for a number of reasons: First, Cowing found that the rate of dissolution of the dissolved gasses is slow, and described that the rate could be accelerated by laying the cylinder containing the sample under applied vacuum on its side in order to expose a large surface area. Cowing failed to quantify how slow the release rate may be; Second, because the piston is the same diameter as the cylinder, the Cowing device also fails to precisely determine low entrained air contents due to errors in measuring the small displacement of the piston when compressing the sample; Third, the large interfacial surface between the released air and the liquid will result in some dissolving of the entrained gas during the compression operation, which will reduce the accuracy of the result, especially at low gas content Matula, U.S. Pat. No. 6,125,688 (2000), describes an apparatus consisting of an isolatable sample vessel equipped with a small diameter piston moveably placed into the vessel so that suitable movement of the piston can generate both pressure and vacuum. Like Cowing, Matula mentions that the rate of dissolution of the dissolved air is very slow. He goes on to mention that ultrasonic vibration can be used to increase the dissolution rate. Matula fails to provide characteristics of the ultrasonic vibration, such as frequency, amplitude, or even how the vibration is coupled to the apparatus, and he does not quantify the effect on rate of dissolution. However, he states that tests may be repeated every 5-10 minutes, which may provide some indication of the slow dissolution rate of the dissolved air.

Using an apparatus very similar to the Cowing apparatus, Dougherty, in results published in trade literature (PAPEC-.com, "SQUEEZER DUALAIR" operating manual, FIG. 3), quantifies the slow release of dissolved air from water as requiring 25 minutes to release 95% of the dissolved air. The prior art clearly indicates that the issues of dealing with slow dissolution rate of dissolved gases have not been well addressed.

Tanguy, et.al, U.S. Pat. No. 3,731,530 (1973), describes an apparatus with two adjacent cylinders of different size, each with corresponding pistons, and connected to each other with a cumbersome tubing arrangement. The larger diameter piston/cylinder is used to pull sample into the "sample chamber" that is comprised of the volumes of the two cylinders and the interconnecting tubing. Following isolation of the sample by means of isolation valves, the piston in the smaller cylinder is moved to apply vacuum to the sample. The relatively small diameter vacuum piston improves the accuracy of determining low entrained gas contents. The stated intent of the Tanguy apparatus and method is to measure the "gas content" of a liquid (drilling mud). Because the method utilizes applied vacuum, it is possible that some dissolved gas may be released so that the measurement of the gas content may include both the original entrained gas and some released dissolved gas. Tanguy does acknowledge that some dissolved gas may be released but does not address how to separate this contribution.

Dougherty, U.S. Pat. No. 4,700,561 (1987), describes a piston and cylinder apparatus wherein a small-diameter compression piston is mounted upon the sample piston opposite the sample-containing side of the sample piston and is moveable through the sample piston into the isolated liquid. Dougherty does not claim the use of the apparatus for measurement of dissolved gasses.

Dougherty, describes in trade literature a piston and cylinder testing apparatus (PAPEC.com, "QUICKAIR" operating manual) where a sample piston within a cylinder is attached in a spring-loaded fashion to a compression piston which is external to the cylinder. Using an over-center lever arrangement, the sample piston/compression piston assembly is retracted into the cylinder to collect a sample. After moving well into the sample cylinder, the sample piston travel is stopped by internal structure. However, continued movement of the over-center lever pulls the compression piston into the sample cylinder, simultaneously isolating and compressing the sample. The movement of the compression piston and the pressure that develops are used to calculate the entrained gas content in the liquid. Dougherty notes that as this operation proceeds the compression piston will fractionally continue into the sample cylinder even when the liquid contains no entrained gas. This is due to limitations with standard seal arrangements, wherein seals may flex with applied pressure, and gas bubbles may become trapped in seal spaces, and furthermore to unintended movement of the pistons. Dougherty refers to this effect as "dead volume". It is notable that while this issue will prevail in every apparatus described in this disclosure of the prior art, Dougherty is the only party to acknowledge and describe the effect. It is clear that mechanical deficiencies in the prior art have dead-volume measurement errors that have not been addressed.

The apparatus described in this disclosure incorporates embodiments which correct deficiencies in the prior art. Significant deficiencies include:
a) There are no piston and cylinder apparatus which can rapidly remove dissolved gas from liquid solution.
b) When prior-art includes a separate small-diameter compression piston for improved accuracy at low entrained gas contents, the mechanical designs are cumbersome.
c) Without exceptions, deficiencies in designs lead to unmanaged dead volume effects.

Some embodiments also include features not previously disclosed in the prior art.

SUMMARY

The practice of determining dissolved and entrained gas content of process streams by means of collection, isolation, separation of dissolved gas from the isolated sample, and determination of entrained gas by compression is taught by example in the description of an apparatus for taking such measurements.

A first consideration is to determine entrained gas in a liquid sample before removing the dissolved gas from the liquid. A second consideration is to provide rapid removal of dissolved gas from the liquid sample. A third consideration is to determine the total gas content, both original entrained gas and dissolved gas that has been removed from solution. A fourth consideration is to minimize the rate of resolution of entrained gas during the compression portion of the test. A fifth consideration is to minimize the effects of unintended piston movements during the compression portion of the test.

A piston and cylinder apparatus comprises two cylinders, one of larger diameter than the other, in conterminal and axial orientation, with a larger liquid-sealed piston positioned within the larger cylinder and a smaller axially positioned liquid-sealed piston positioned within the larger piston and extendable out of the larger piston and into the smaller cylinder. The smaller piston may be of smaller diameter than the smaller cylinder thereby increasing the accuracy of the measurement at low gas contents. Liquid sample is isolated in the smaller cylinder by suitable movement of the pistons and positioning of one or two isolation valves. The isolated sample is compressed by extension of the smaller piston out of the larger piston and into the smaller cylinder. A pressure means measures the pressure that is developed and a piston-movement means measures the travel of the smaller piston. This compressive information is used to calculate the volume of entrained gas in the liquid sample, by the use of suitable gas law relationships.

Following measurement of the entrained gas, the smaller piston is retracted into the larger piston and the larger piston is retracted to apply a vacuum to the sample, releasing dissolved gas. The transfer of the liquid sample into the much larger cylinder maximizes the surface area of the sample and minimizes the depth of the liquid resting upon the larger piston, resulting in the release of the dissolved gas in a few seconds, as compared to many minutes with prior art.

Following removal of the dissolved gas, the apparatus is inverted to transfer remaining liquid and free gas, which includes both the original entrained gas and the released dissolved gas, to the smaller cylinder. This procedure minimizes the surface area between the gas and the liquid, and maximizes the depth of the liquid layer, thereby minimizing the tendency for the gas to re-dissolve when the vacuum is released. The larger piston is extended to release the vacuum and isolate the liquid/gas mixture within the smaller cylinder.

The total gas volume is then determined by the compression procedure previously described. The dissolved gas contribution is determined by subtracting the previous entrained gas volume, with suitable corrections for pressure differences.

DRAWINGS

Figure 1:
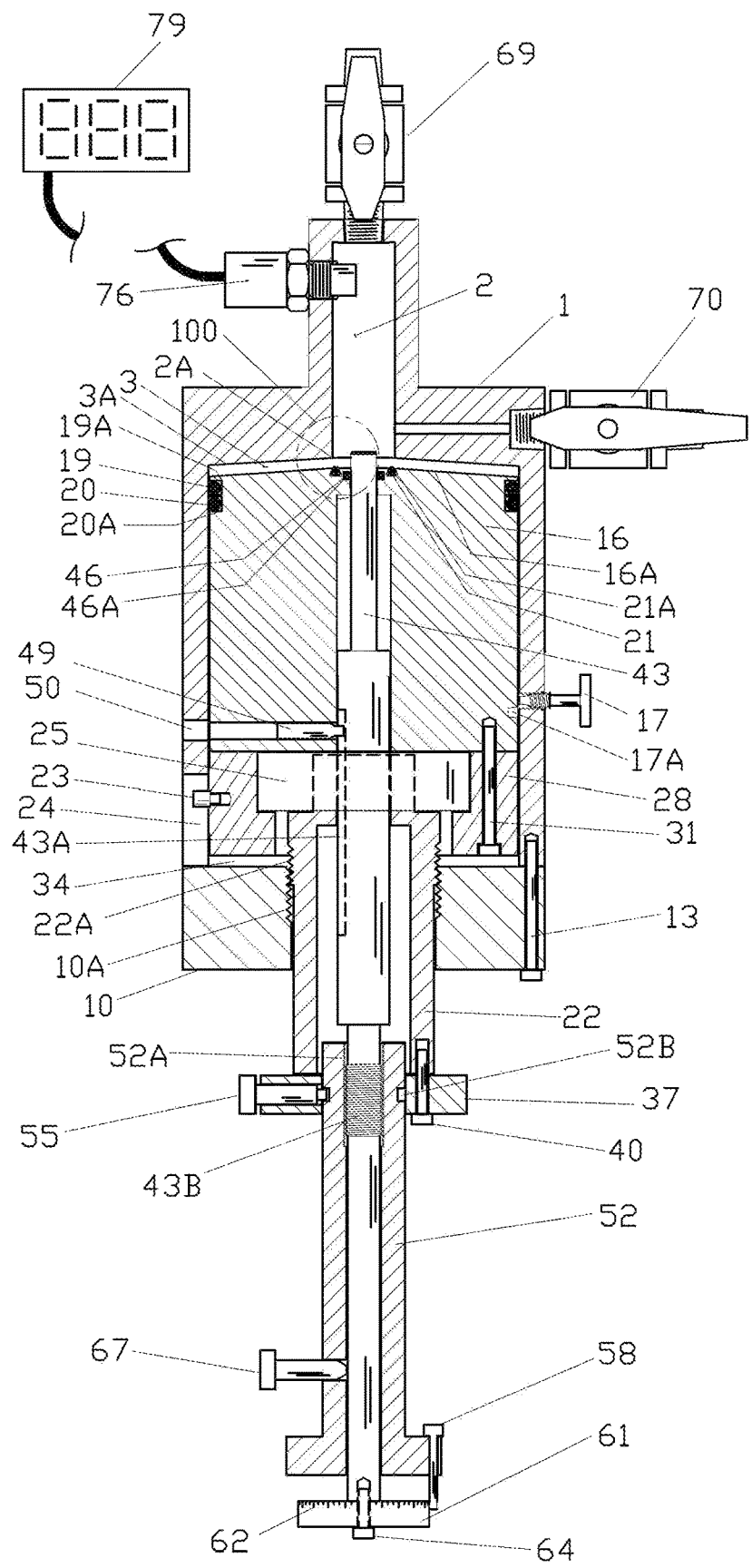
FIG. 1 is an open cross section of the complete apparatus positioned in the upright position.

| REFERENCE NUMERALS | |
|---|---|
| 1 | Housing |
| 1A | Housing top |
| 1B | Housing bottom |
| 1C | Junction |
| 2 | Sample cylinder |
| 2A | Directional seal surface |
| 3 | Vacuum cylinder |
| 3A | Vacuum cylinder proximal surface |
| 4 | Housing coupling bolts |
| 10 | Housing base |
| 10A | Mating threads |
| 13 | Housing base bolts |
| 16 | Vacuum piston |
| 16A | Vacuum piston upper surface |
| 17 | Vacuum piston locking screw |
| 17A | Vacuum piston locking hole |

-continued

| REFERENCE NUMERALS | |
|---|---|
| 19 | Vacuum piston upper seal |
| 19A | Upper seal groove |
| 20 | Vacuum piston lower seal |
| 20A | Lower seal groove |
| 21 | Directional seal |
| 21A | Directional seal groove |
| 21B | Seal peak |
| 22 | Vacuum piston actuator |
| 22A | Threads |
| 23 | Pin |
| 24 | Housing slot |
| 25 | Bearing |
| 28 | Bearing holder |
| 31 | Bearing holder bolts |
| 34 | Spacing |
| 37 | Vacuum piston actuator base |
| 40 | Actuator base attachment bolts |
| 43 | Compression piston |
| 43A | Compression piston slot |
| 43B | Compression piston threads |
| 46 | Compression piston seal |
| 46A | Compression piston seal groove |
| 49 | Limit pin |
| 50 | Limit pin access port |
| 52 | Compression piston actuator |
| 52A | Mating actuator threads |
| 52B | Radial slot |
| 55 | Rotation pin |
| 58 | Index pin |
| 61 | Index wheel |
| 62 | Index marks |
| 64 | Index wheel mounting bolt |
| 67 | Locking screw |
| 69 | Top isolation valve |
| 70 | Bottom isolation valve |
| 72 | Liquid layer |
| 76 | Pressure transducer |
| 79 | Processor |
| 90 | Process fluid |
| 92 | Supply valve |
| 93 | Discharge valve |
| 94 | Three-way valve |
| 100 | Phantom Line |

DETAILED DESCRIPTION

FIG. 1, which is an open cross section of the complete apparatus positioned in the upright position, illustrates a first embodiment.

Housing 1 provides a framework for the apparatus. Housing 1 may be a round bar. In alternative embodiments, housing 1 may be any general shape such as square bar, hollow rod, or cast shape. Housing 1, and indeed all of the parts described herein, can be fabricated out of any material which is compatible with the environment in which the apparatus is to be used.

Housing 1 encloses two cylindrical chambers: vacuum cylinder 3, and sample cylinder 2. Sample cylinder 2 and vacuum cylinder 3 are axially aligned and conterminally placed as shown, whereby the two cylinders are in intimate connection without the need for interconnecting devices and contrivances. Sample cylinder 2 and vacuum cylinder 3 may be machined into housing 1, or may be formed by various combinations of casting, drilling, and machining.

In the continuing description, for purposes of clarity:
a. The proximal ends of vacuum cylinder 3 and sample cylinder 2 are at the junction of the two cylinders within housing 1.
b. The distal end of vacuum cylinder 3 is at the bottom of the apparatus illustrated in FIG. 1.
c. The distal end of sample cylinder 2 is at the top of the apparatus illustrated in FIG. 1.

Sample cylinder 2 is of smaller diameter than vacuum cylinder 3. The diameters of sample cylinder 2 and vacuum cylinder 3 are determined primarily on the basis of the ratio of the cross-sectional areas of the two cylinders, with a first embodiment to attain a ratio for cross sectional area of vacuum cylinder 3 divided by cross sectional area of sample cylinder 2 of at least 25. Therefore, for example, a diameter of 15.2 mm (0.6") for sample cylinder 2 and a diameter of 76.2 mm (3") for vacuum cylinder 3 will provide a ratio of 25, which satisfies this objective. A ratio of 25 results in a release of dissolved gas from liquid during operation approximately 20 times faster than prior art. Nevertheless, other embodiments can still be practiced with cross sectional ratios greater than or less than 25. Greater ratios result in reduced time to release dissolved gas from the liquid and vice versa.

Housing base 10 closes the distal end of housing 1 and is attached to housing 1 with housing base bolts 13 (one shown). It is clear that housing base 10 could be attached by other means, such as threaded connection or flanges.

In a first embodiment, bottom isolation valve 70, at the proximal end of sample cylinder 2, and top isolation valve 69, at the distal end of sample cylinder 2, may be used in various combinations to control access to sample cylinder 2. For convenience in the detailed description, this first embodiment may be referred to as a "first two-valve embodiment". An alternate embodiment utilizes a single isolation valve, top isolation valve 69, to control access to sample cylinder 2. For convenience in the detailed description, this alternate embodiment may be referred to as a "first one-valve embodiment".

A first piston, herein referred to as vacuum piston 16 is positioned within vacuum cylinder 3. Vacuum piston locking hole 17A is positioned in the side of vacuum piston 16 such that when vacuum piston 16 is fully extended (upward in FIG. 1) then vacuum piston locking screw 17 may be extended into hole 17A to lock vacuum piston 16 securely in place when required during the operating procedure. Clearly in alternate embodiments, various other locking mechanisms can be easily designed.

In FIG. 1, vacuum piston 16 is illustrated at an intermediate position of its travel. Vacuum piston upper surface 16A is not in contact with vacuum cylinder proximal surface 3A. However, in the fully extended position, vacuum piston 16 is positioned so that vacuum piston upper surface 16A is in contact with vacuum cylinder proximal surface 3A. It should be apparent that with vacuum piston 16 fully extended, the volume of vacuum cylinder 3 is zero. Surface 16A is sloped to exactly match surface 3A so that when vacuum piston 16 is in the fully extended position there will be insignificant voids between the two surfaces.

Surface 3A is angled upward as shown so that in the event that housing 1 is not perfectly upright as illustrated in FIG. 1:
a. Any gas bubbles entrained in liquid that is contained between surface 16A and surface 3A will not become trapped but, rather, will be expelled into sample cylinder 2 as vacuum piston 16 becomes fully extended.
b. When housing 1 is inverted, liquid contained within vacuum cylinder 3 will flow unimpeded into sample cylinder 2 when vacuum piston 16 is not fully extended.

In a first embodiment, surface 3A slopes upward with 2.54 mm (0.1") rise per 38.1 mm (1.5") run, which can be expressed as a slope of 0.067. It is clear that slopes greater than this can be used, although greater slopes undesirably increase the depth of the liquid sample when the apparatus is configured in the vacuum mode, as described in due course. It is also clear that smaller slopes may be used, including a completely flat surface 3A, albeit at the risk that liquid and gas pockets may be trapped in vacuum cylinder 3 if the apparatus is not maintained in a vertical position during the test procedure.

Vacuum piston actuator 22 is coupled to vacuum piston 16 by means of bearing 25, which is pressed onto vacuum piston actuator 22, and bearing holder 28, which is connected to the distal end of vacuum piston 16 with bearing holder bolts 31 (one shown). Vacuum piston actuator 22 also couples to housing base 10 by means of threads 22A on vacuum piston actuator 22, and mating threads 10A on housing base 10. In a first embodiment, threads 22A and mating threads 10A are UNF-12 right-hand threads. In alternate embodiments, many other thread patterns can be used.

Rotation of vacuum piston actuator 22 serves to linearly translate vacuum piston 16 within vacuum cylinder 3. With right-hand threads 22A and right-hand mating threads 10A, it is clear that clockwise rotation of vacuum piston actuator 22 will move vacuum piston 16 in the upward direction. This motion is referred to as "extension" in this description. Pin 23 is fixed in bearing holder 28 and slides in housing slot 24 to prevent rotation of vacuum piston 16. The linear travel of vacuum piston 16 is limited by the spacing 34 between bearing holder 28 and housing base 10. In a first embodiment, spacing 34 is designed so that when vacuum piston 16 is initially in the fully extended position with liquid in sample cylinder 2, and then vacuum piston 16 is fully retracted: a) the entire contents of liquid contained within sample cylinder 2 will be transferred to vacuum cylinder 3; b) the upper surface of the liquid resting on surface 16A of vacuum piston 16 will be completely free, i.e., the liquid surface will not be in contact with vacuum cylinder proximal surface 3A; c) vacuum piston upper surface 16A will be completely wetted with liquid. These conditions minimize the time for dissolved gas to release from solution during the vacuum step of the operating procedure. As described above, in a first embodiment a ratio for the cross-sectional area of vacuum cylinder 3 divided by the cross-sectional area of sample cylinder 2 is 25, and the slope of vacuum piston upper surface 16A is 0.067. A first embodiment may have a sample cylinder 2 diameter of 15.2 mm (0.6") and a height of 50.8 mm (2"). Therefore, in a first embodiment, calculations determine that the linear travel of vacuum piston 16 should be at least 4.3 mm (0.17"). With an additional function of vacuum piston 16 being to generate a high vacuum when vacuum piston 16 is retracted, a preferred linear travel for vacuum piston 16 may be 5.1 mm (0.2"). It is clear that a variety of cylinder and piston geometries will meet the criteria provided above.

Vacuum piston actuator base 37 is attached to vacuum piston actuator 22 with actuator base attachment bolts 40 (one shown). In a first embodiment, vacuum piston actuator 22 is rotated by manually rotating vacuum piston actuator base 37. Vacuum piston actuator base 37 is of larger diameter than the diameter of vacuum piston actuator 22, thereby providing improved mechanical advantage for the rotation of the combination of vacuum piston actuator 22 and vacuum piston actuator base 37.

It is clear that in alternate embodiments other methods can accomplish this rotation such as rotary actuators, which can allow automated operation. It is also clear that that the actuation mechanism just described can be accomplished with linear actuators, such as pneumatic cylinders, hydraulic cylinders, or solenoids.

A second piston, herein referred to as compression piston 43, is axially positioned and liquid sealed in vacuum piston 16. Compression piston seal 46 provides a liquid seal between vacuum piston 16 and compression piston 43. In a first embodiment, seal 46 is a standard 70 durometer o-ring made of an elastomer that is compatible with the liquids and gasses to be contacted, and compression piston seal groove 46A is of standard dimensions. In alternate embodiments, tighter o-ring grooves, stiffer seals, lip seals and so forth may be used to reduce dead volume effects (recall that the phrase "dead volume" was previously defined in the Background section), although the dead volume contribution of standard seal design in this part of the apparatus is vanishingly small.

The diameter of compression piston 43 may be less than the diameter of sample cylinder 2 in order to increase the measurement accuracy at low entrained gas contents during the compression phase of the testing procedure. The maximum diameter of compression piston 43 is limited by the diameter of sample cylinder 2. In a first embodiment with a sample cylinder 2 diameter of 15.2 mm (0.6"), a compression piston 43 diameter of 6.4 mm (0.25") provides a good balance between piston travel and entrained gas content. Clearly, in alternate embodiments, many other diameters can be used for compression piston 43.

The range of linear travel of compression piston 43 is limited by limit pin 49 placed in the side of vacuum piston 16 so that limit pin 49 extends into compression piston slot 43A in the side of the compression piston 43. Limit pin 49 serves the additional function of preventing compression piston 43 from rotating; the piston can only translate linearly. Compression piston slot 43A is designed so that in the retracted position, the top surface of compression piston 43 is flush with the top of vacuum piston 16. Slot 43A also limits how far compression piston 43 can be extended into sample cylinder 2. Limit pin access port 50 in the side of housing 1 allows access to limit pin 49 without disassembly of the apparatus.

Compression piston actuator 52 slides onto compression piston 43 and couples to compression piston 43 by means of compression piston threads 43B and mating threads 52A. Rotation pin 55 is installed into vacuum piston actuator base 37, and can be inserted into or retracted from radial slot 52B in compression piston actuator 52. When inserted into radial slot 52B, rotation pin 55 allows rotation of compression piston actuator 52 relative to compression piston 43, while simultaneously preventing linear motion of compression piston actuator 52. In this configuration, rotary motion of compression piston actuator 52 causes linear translation of compression piston 43 into or out of sample cylinder 2. The thread per inch (TPI) of compression piston threads 43B (male threads) and compression piston mating actuator threads 52A (female threads) controls the amount of linear translation of compression piston 43 as compression piston actuator 52 is rotated. In a first embodiment, a TPI of 24 provides sufficient accuracy at low entrained gas while keeping the rotations required at high entrained gas contents to reasonable values. Clearly, both higher and lower TPI can be used. In a first embodiment, compression piston threads 43B and threads 52A are left-hand. Study of FIG. 1 shows that with this design, clockwise rotation of compression piston actuator 52 results in the extension of compression piston 43 into sample cylinder 2, which is a logical behavior for most operators. Nevertheless, it is clear that compression piston threads 43B and threads 52A can also be right hand.

In a first embodiment, compression piston actuator 52 is rotated manually. It is clear that other methods can produce this rotation, such as rotary actuators, which can allow automated operation.

When rotation pin 55 is retracted, the assembly of compression piston 43 and compression piston actuator 52 is free to move linearly, within the limits of compression piston slot 43A. In a first embodiment, this linear motion is produced by manual movement of the assembly. It is clear that this linear motion can be accomplished with various linear actuators, which can also allow for automated operation. Also, while rotation pin 55 is retracted, locking screw 67 is used to lock compression piston actuator 52 to compression piston 43 in order to prevent inadvertent rotation of compression piston actuator 52 around compression piston 43.

As will become apparent in later discussion of operating methods, some embodiments do not require functionality that allows linear movement of compression piston 43 and compression piston actuator 52 as a single assembly. In that case, rotation pin 55 is most conveniently fixed in place, inserted into slot 52B.

Index pin 58 is installed in compression piston actuator 52 as shown. Index wheel 61 is attached to the distal end of compression piston 43 with index wheel mounting bolt 64. The perimeter of index wheel 61 is scored with index marks 62. Linear travel of compression piston 43 as compression piston actuator 52 is rotated (rotation pin 55 inserted) is measured by the number of index marks 62 traversed by index pin 58 and the TPI of mating actuator threads 52A. In an alternate embodiment, index pin 58 can be installed in index wheel 61 and index marks 62 can be scored onto compression piston actuator 52.

It is clear that other methods may be used to measure the linear translation of compression piston 43. Examples may include:
a. a rotary encoder fixedly attached to the distal end of compression piston 43 and radially attached slidably to the distal end of compression piston actuator 52;
b. a proximity sensor to count index marks on index wheel 61;
c. a linear position transducer coupled between compression piston 43 and compression piston actuator 52.

Vacuum piston upper seal 19 and vacuum piston lower seal 20 provide a liquid-sealed arrangement between vacuum cylinder 3 and the assembly of vacuum piston 16, compression piston 43, and compression piston seal 46. In a first embodiment:
a. Upper seal groove 19A and lower seal groove 20A are of standard design.
b. Upper seal 19 is a square o-ring of 70 durometer c. Lower seal 20 is a standard o-ring of 90 durometer.
d. A suitable elastomer is buna rubber.

These seal specifications result in minimum in-leakage of air into the apparatus and insignificant dead volume when the apparatus is operated in the vacuum mode.

A wide variety of seals and seal groove design can be used in alternate embodiments, including but not limited to:
a. Seals of different cross section and design such as hydraulic "lip" seals, o-rings containing multiple points of contact, commonly referred to as "X-Profile" o-rings, and hybrid seals such as seals with a rubber outer layer contained over a metal spring.
b. Seals of different materials such as Teflon, Teflon variants including glass-filled Teflon, Viton, fluoroelastomers, silicone, and metal.
c. Seals of alternate durometer, less than 70 d and greater than 90 d.
d. Seal grooves of nonstandard dimensions.

Directional seal 21 serves to seal the proximal end of sample cylinder 2 when the apparatus is configured in the pressure mode. The area identified by phantom line 100 in FIG. 1 is expanded in FIGS. 2A-C for clearer viewing and description of directional seal 21.

Figure 2A:
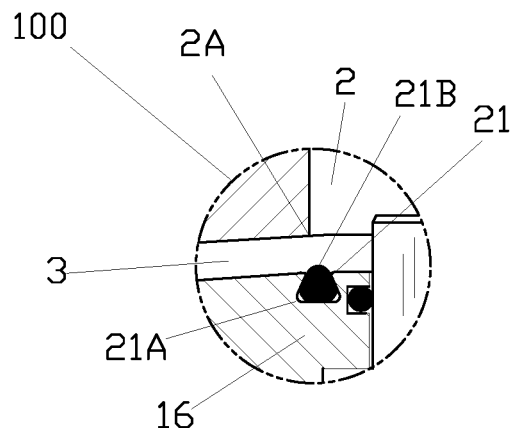
FIG. 2A is an open cross section of an expanded portion of FIG. 1 showing the positions of a directional seal when vacuum piston is retracted.

FIG. 2A illustrates a position for vacuum piston 16 wherein vacuum piston 16 is retracted approximately halfway, as it would be during the vacuum portion of a test. Directional seal surface 2A is the junction of the proximal ends of sample cylinder 2 and vacuum cylinder 3. Seal peak 21B is the highest point of directional seal 21, as shown. Directional seal 21 is not in contact with directional seal surface 2A and therefore directional seal 21 performs no sealing function in this configuration. Directional seal groove 21A is of trapezoidal cross section so that directional seal 21 is retained within directional seal groove 21A while the apparatus is configured in vacuum mode.

Figure 2B:
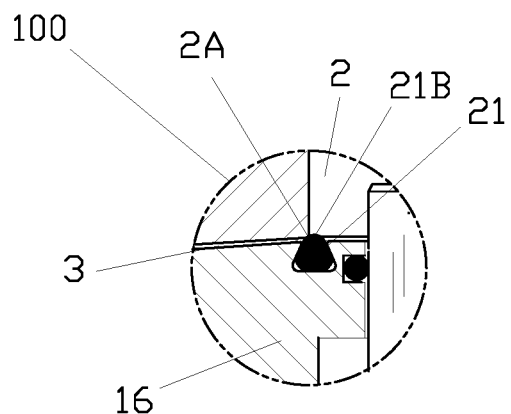
FIG. 2B is an open cross section of an expanded portion of FIG. 1 showing the positions of a directional seal just as vacuum piston is moved towards the fully extended position.

FIG. 2B illustrates a position for vacuum piston 16 wherein vacuum piston 16 is very nearly fully extended. Directional seal 21 is slightly in contact with directional seal surface 2A. The volume of vacuum cylinder 3 is almost zero. If directional seal 21 makes a solid contact with directional seal surface 2A at this point in the test, then as vacuum piston 16 is extended further, the pressure that develops within vacuum cylinder 3 will become very high. This leads to numerous issues which can include damage to seals, damage to structure, and inconsistent break-through of highly pressurized liquid into sample cylinder 2 thereby confusing the compression mode of the test. The situation can be controlled by making the diameter of seal peak 21B less than the diameter of directional seal surface 2A, whereby as vacuum piston 16 is further extended, seal peak 21B deforms away from directional surface 2A and into sample cylinder 2. Consequently, pressure does not significantly increase in vacuum cylinder 3 as liquid bleeds past the seal.

Figure 2C:
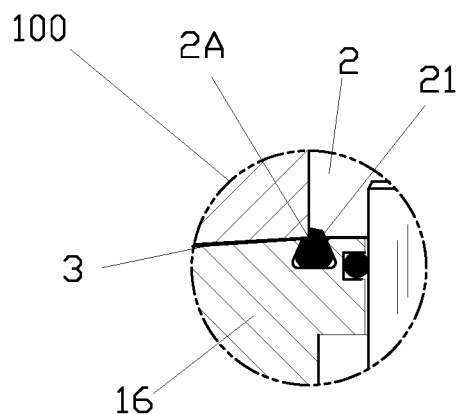
FIG. 2C is an open cross section of an expanded portion of FIG. 1 showing the positions of a directional seal when vacuum piston is fully extended.

FIG. 2C illustrates vacuum piston 16 in the fully extended position. The volume of vacuum cylinder 3 is now zero. With respect to sample cylinder 2 and directional seal surface 2A, directional seal 21 is now pressed into a tight seal with directional seal surface 2A, thereby completely sealing the proximal end of sample cylinder 2.

The use of directional seal 21 results in a very much reduced dead volume effect during the test. This is explained as follows: For the dimensions that have previously been provided for a first embodiment, if vacuum piston 16 should recede by as little as 0.025 mm (0.001") as pressure builds during the compression portion of the test, then the dead volume would calculate as 0.1% v/v. If directional seal 21 were eliminated so that seal 19 would provide sealing for both vacuum and compression portions of the test, then the dead volume would calculate as 1.8% v/v. Prior art does not include this feature and this design provides a substantial improvement over prior art.

In a first embodiment a set of properly balanced dimensions and materials that provide release of pressure from vacuum cylinder 3 while still providing proximal seal of compression cylinder 2 include:
a. Directional seal 21 is an o-ring of size −111, 50 d, buna rubber
b. Diameter of directional seal surface 2A is 15.2 mm (0.6")
c. Directional seal surface 2A is a square corner
d. Diameter of seal peak 21B is 14.2 mm (0.558")

e. Directional seal groove 21A is machined using International Tool P/N 53-4010, to a width of 3.00 mm (0.118") and a depth of 2.08 mm (0.082").

It is apparent that in alternate embodiments, many other dimensions and seals can provide the directional sealing just described. In addition, in an alternate embodiment, directional seal surface 2A may be a beveled corner.

Returning to FIG. 1, pressure transducer 76 measures the pressure during the testing procedure. In a first embodiment, pressure transducer 76 is of flush diaphragm construction so that no liquid or gas can collect in the end of the pressure transducer. Pressure transducer 76 is of strain gauge design. It is clear that other pressure sensors can be used to measure the pressure changes during the testing procedure, including both diaphragm-isolated and not diaphragm-isolated, and including other pressure transduction methods such as piezo resistive, capacitance, and even barometric tube. In a first embodiment, pressure transducer 76 may be a commonly available transducer with any dimensions and mounting means that allow it to be installed into the apparatus. As an example, pressure transducer part PX610, available from Omega Engineering, is suitable.

In a first embodiment, processor 79 provides electrical power to pressure transducer 76 and converts and displays the output therefrom as pressure units. In an alternate embodiment, it is clear that processor 79 may additionally be designed with the ability to process transducer signals from the linear translation of compression piston 43, thereby obtaining sufficient information to calculate and display test results automatically. Whereas the circuitry in remote processor 79 needed to provide this additional capability generally does not require any new art, it is clear that in some embodiments said circuitry may be sufficiently novel as to be unobvious to one skilled in the art.

As illustrated in FIG. 1, top isolation valve 69 enters sample cylinder 2 from the top and pressure transducer 76 enters sample cylinder 2 from the side. It is readily apparent that an alternate embodiment can exchange the positions of top isolation valve 69 and pressure transducer 76.

Figure 3:
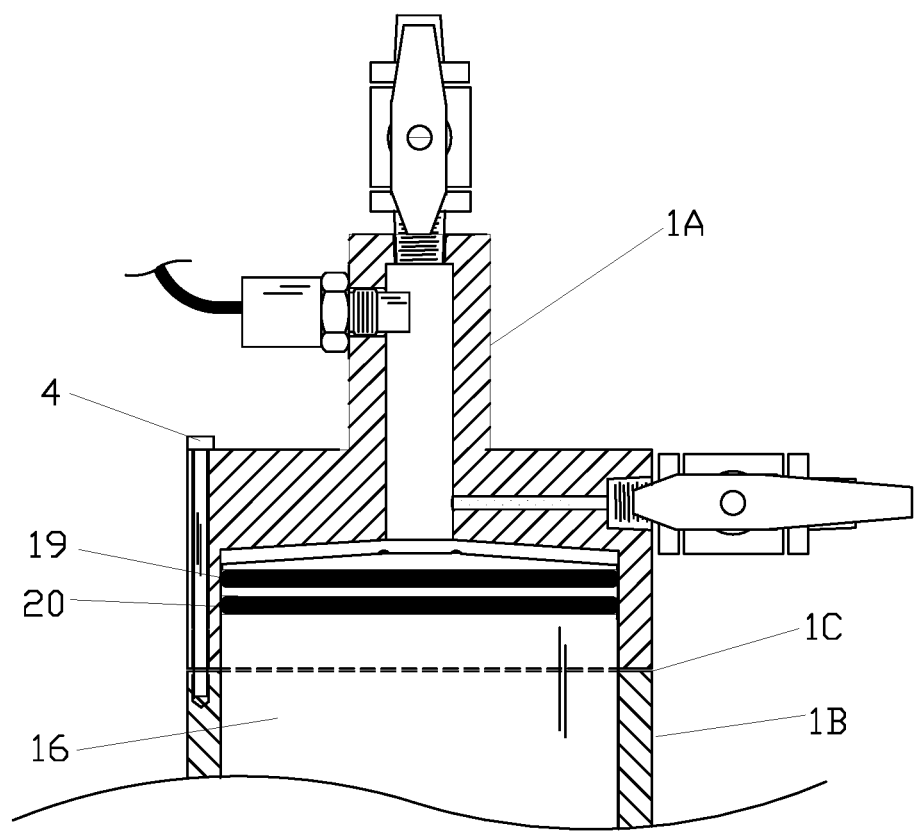
FIG. 3 is an open cross section of an alternate embodiment incorporating a two-part housing.

As explained above, in a first embodiment housing 1 is a single piece. Clearly, as shown in FIG. 3, in an alternate embodiment housing 1 may be manufactured in two pieces, housing top 1A and housing bottom 1B, coupled together with housing coupling bolts 4 (one shown), or any other convenient coupling means such as over-directional latches. Housing top 1A and housing bottom 1B meet at junction 1C. Junction 1C can be positioned along the axial direction as may be convenient. When junction 1C is positioned as shown in FIG. 3, then at the furthest retracted position of vacuum piston 16, as illustrated in FIG. 3, seal 19 seal 20 remain above junction 1C, thereby eliminating the need for a seal at junction 1C.

Figure 5:
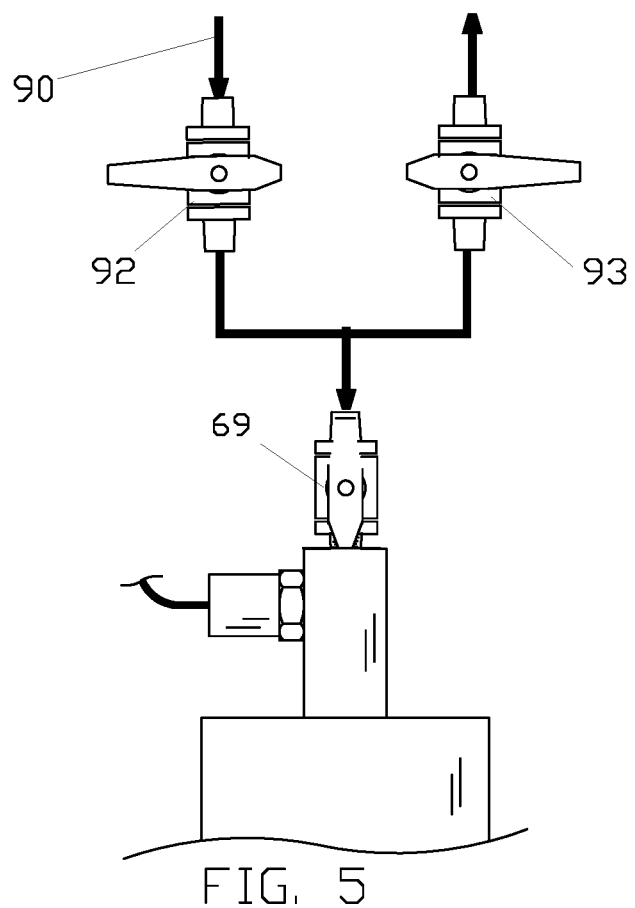
FIG. 5 is a possible method for supplying liquid to a first one-valve embodiment.
Figure 4:
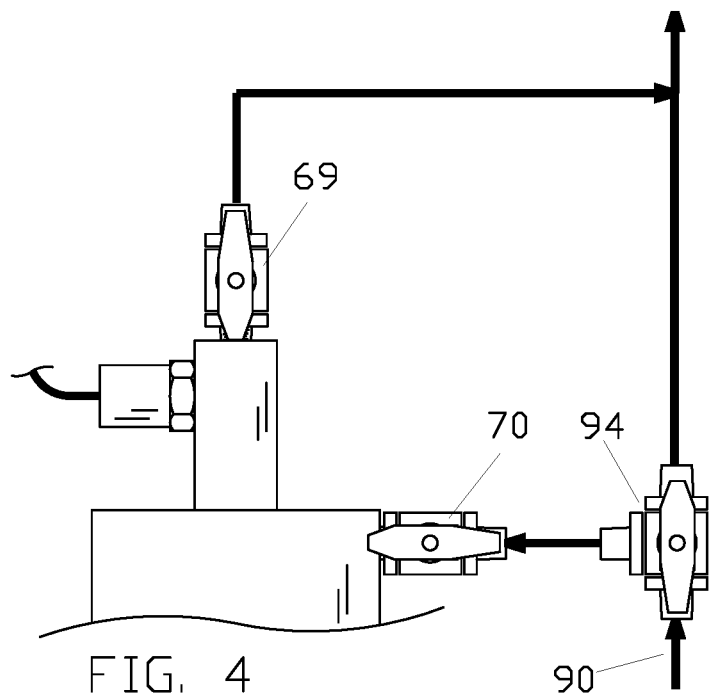
FIG. 4 is a possible method for supplying liquid to a first two-valve embodiment.

External connections used to provide process liquid to the apparatus may vary widely and do not require any new art. However, for the purposes of explaining the operation of the apparatus, possible connections may be implemented as follows. Referring to FIG. 4, for a first two-valve embodiment, process fluid 90 is made available to the apparatus at bottom isolation valve 70. Three-way valve 94 may be positioned to route process fluid 90 into or around the apparatus. Referring to FIG. 5, for a first one-valve embodiment, process fluid 90 is made available to the apparatus at top isolation valve 69. Supply valve 92 and discharge valve 93 control the distribution of the liquid flow. When the apparatus is configured to expel liquid, supply valve 92 is closed and discharge valve 93 is open. When the apparatus is configured to receive liquid, supply valve 92 is open and discharge valve 93 is closed.

Figure 6:
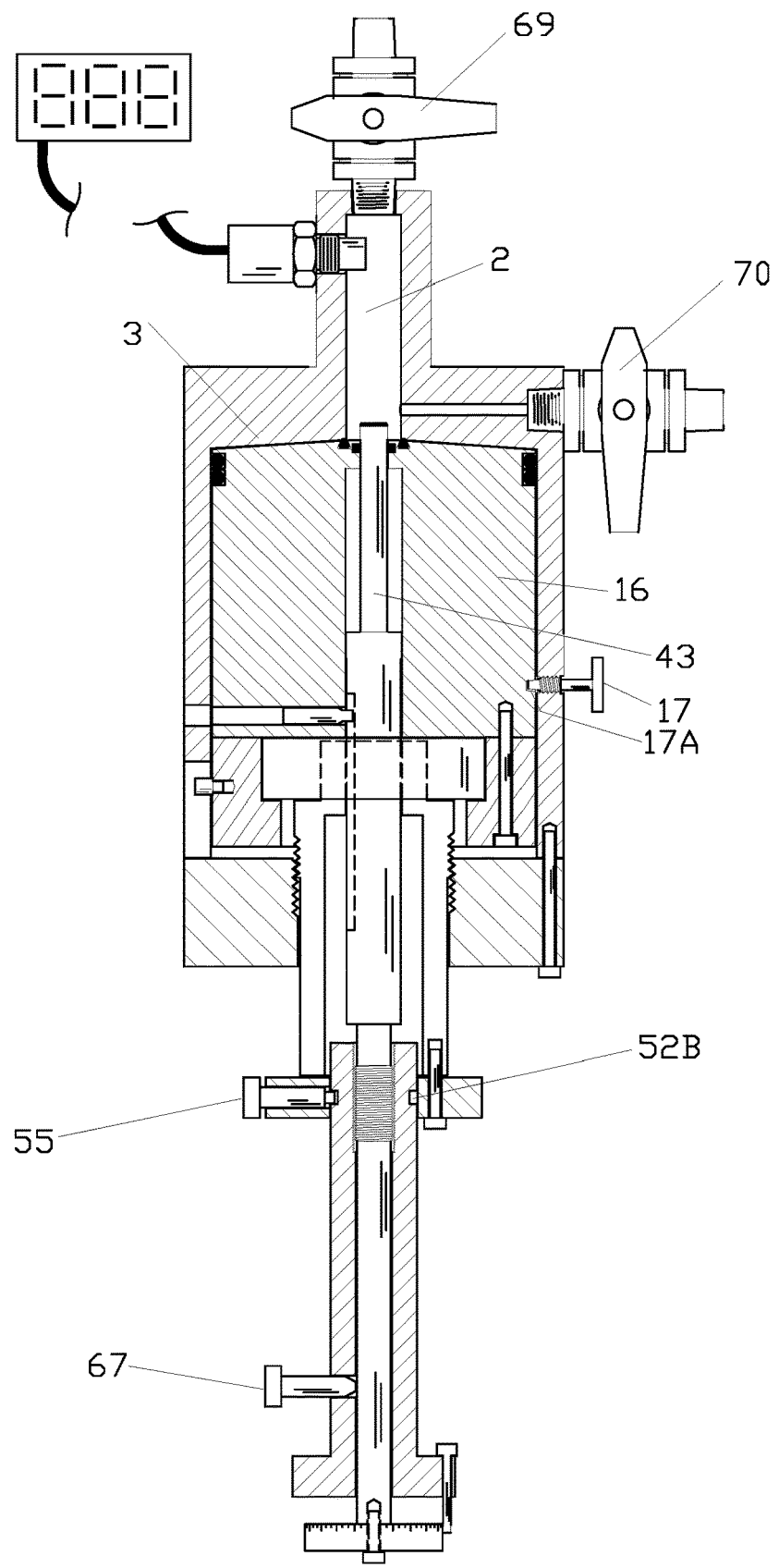
FIG. 6 is an open cross section illustrating the configuration of a first embodiment at the end of a test.

For a first two-valve embodiment, FIG. 6 illustrates the configuration of the apparatus at the completion of a previous test. Sample cylinder 2 contains the previous sample. Vacuum piston 16 is fully extended so that the volume of vacuum cylinder 3 is zero. Top isolation valve 69 and bottom isolation valve 70 are closed. Compression piston 43 is partially extended. Rotation pin 55 is inserted into radial slot 52B and locking screw 67 is locked. Vacuum piston locking screw 17 is inserted into vacuum piston locking hole 17A.

Continuing to refer to FIG. 6, a new sample is collected and isolated in sample cylinder 2 as follows:
1. Top isolation valve 69 and bottom isolation valve 70 are opened to allow liquid to pass through sample cylinder 2.
2. Locking screw 67 is retracted.
3. Compression piston 43 is retracted completely by rotation of compression piston actuator 52.
4. Locking screw 67 is inserted to lock compression piston actuator 52 to compression piston 43.
5. Top isolation valve 69 and bottom isolation valve 70 are closed.

For a first one-valve embodiment, the configuration at the end of the previous test is identical to that for a first two-valve embodiment, as just described, with the exception that there is no bottom isolation valve 70.

Continuing to refer to FIG. 6 while keeping in mind that isolation valve 70 is not installed, fresh sample is collected and isolated in sample cylinder 2 as follows:
1. Top isolation valve 69 is opened.
2. Locking screw 67 is retracted.
3. Compression piston 43 is fully retracted by rotating compression piston actuator 52.
4. Locking screw 67 is inserted to lock compression piston actuator 52 to compression piston 43.
5. Vacuum piston locking screw 17 is retracted from vacuum piston locking hole 17A.
6. Fresh liquid is received into and expelled from the apparatus by retracting and extending vacuum piston 16 until the liquid previously contained in sample cylinder 2 has been replaced with fresh liquid.

It is clear that vacuum piston 16 movement in Step 6 is allowing the apparatus to operate as a syringe for the collection of liquid. This allows collection of liquid from small process liquid volumes that might be collected, for example, in a beaker.

7. When the previous sample has been sufficiently purged from sample cylinder 2, vacuum piston 16 is fully extended and vacuum piston locking screw 17 is inserted into vacuum piston locking hole 17A.
8. Top isolation valve 69 is closed.

Following the collection and isolation of liquid in sample cylinder 2, continuing operation is the same for either a first single-valve embodiment or a first two-valve embodiment.

Continuing to refer to FIG. 6, The volume of gas entrained in liquid isolated in sample cylinder 2 is measured as follows:
1. Starting pressure P1e ("e" designating entrained gas), as measured by pressure transducer 76 and shown on processor 79, is recorded.
2. Locking screw 67 is retracted.
3. Compression piston actuator 52 is rotated to advance compression piston 43 into sample cylinder 2 to obtain and record a final pressure P2e.

4. The amount of rotation of compression piston actuator 52 is measured by counting the passage of index marks 62 traversed by pin 58. The revolutions and fraction of revolutions are recorded as NTe.

Then for the case of ideal gas behavior, the volume of entrained gas is calculated by $$V1e = P2e/(P2e-P1e)*Ap*NTe/TPI \quad (1)$$

Where:
- V1e is volume of entrained gas at the starting pressure P1e
- P1e is the starting pressure (absolute).
- P2e is the ending pressure (absolute).
- Ap is the surface area of compression piston 43. (in$^2$)
- NTe is the number of turns of compression piston actuator 52.
- TPI is the number of threads per inch of compression piston threads 43B.

Continuing with the operation, the volume of gas dissolved in liquid isolated in sample cylinder 2 is measured as follows:

1. Compression piston 43 is retracted completely by rotation of compression piston actuator 52.
2. Locking screw 67 is inserted to lock compression piston actuator 52 to compression piston 43.
3. Vacuum piston locking screw 17 is retracted from vacuum piston locking hole 17A.
4. Vacuum piston 16 is fully retracted to increase the volume of vacuum cylinder 3, thereby producing a high vacuum on the liquid sample.

Figure 7:
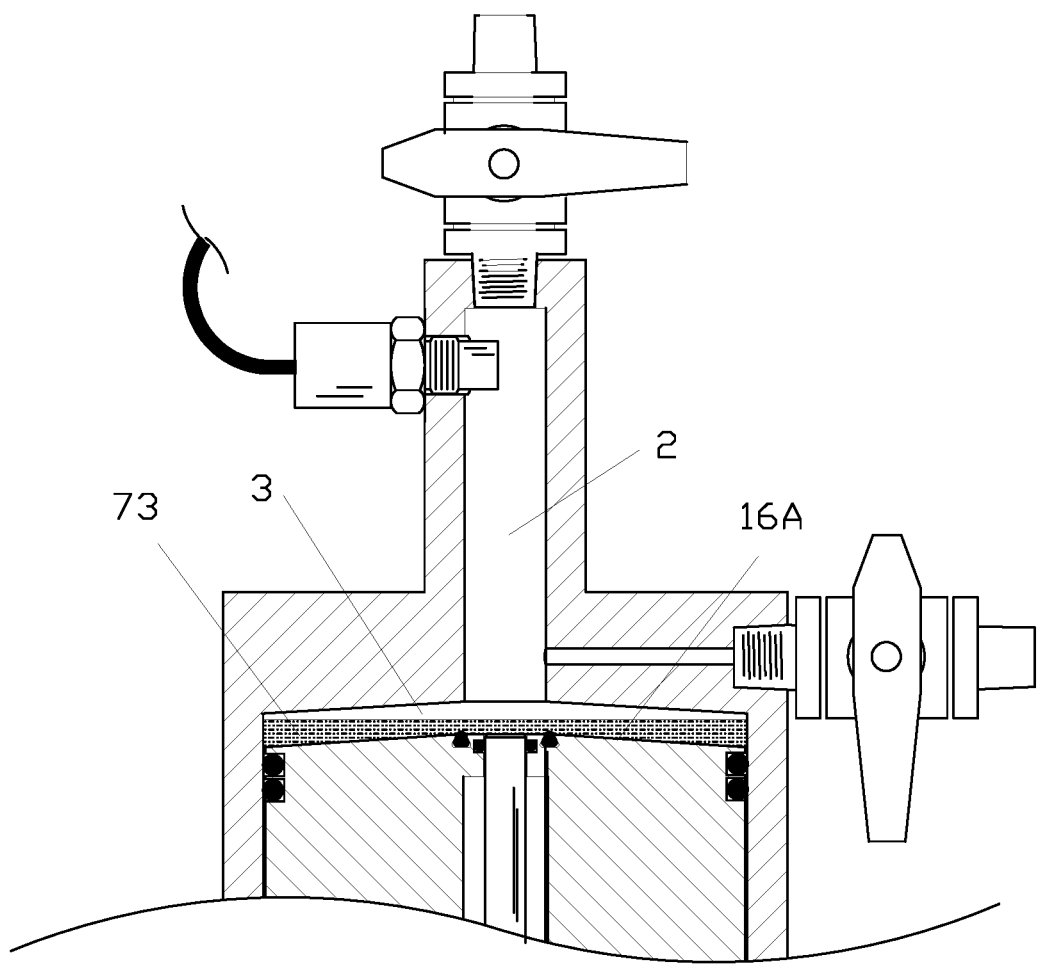
FIG. 7 is an open cross section showing the position of the liquid at that point in the operation where vacuum has been applied to the isolated liquid sample.

As illustrated in FIG. 7, the liquid previously contained in sample cylinder 2 is now a thin liquid layer 73 with a large free surface area residing entirely in vacuum cylinder 3 and upon vacuum piston upper surface 16A. The thin layer, large surface area, and high vacuum minimizes the time needed to remove dissolved gas from the liquid. With classical piston and cylinder apparatus, time to remove the dissolved gas may approach 30 minutes. In the present apparatus, dissolved gas is removed in a small fraction of that time.

Returning to FIG. 6,

5. The absolute pressure displayed by processor 79, referred to as "P_REF", is recorded.
6. The apparatus is inverted, causing remaining liquid to flow into sample cylinder 2 and sufficient time is allowed for the liquid to transfer completely out of vacuum cylinder 3.
7. Vacuum piston 16 is fully extended, thereby releasing the vacuum and isolating the degassed liquid and free gas, comprised of released dissolved gas and original entrained gas, in sample cylinder 2.

The surface area between gas and liquid in sample cylinder 2 is now very small. Therefore, although the pressure has been restored, the dissolved gas that has been released re-dissolves very slowly. For the time needed to complete the test, this decrease is immaterial.

8. The apparatus is returned to the upright position.
9. Vacuum piston locking screw 17 is inserted into vacuum piston locking hole 17A.
10. Locking screw 67 is retracted.
11. Compression piston actuator 52 is rotated to advance compression piston 43 into sample cylinder 2 until pressure indication on processor 79 begins to increase, thereby ensuring that thread hysteresis is eliminated.
12. Starting pressure P1t ("t" designating combined gas, both original entrained gas and the released dissolved gas), as measured by pressure transducer 76 and shown on processor 79, is recorded.
13. Compression piston actuator 52 continues to be rotated to advance compression piston 43 into sample cylinder 2 to obtain and record a final pressure P2t.
14. The amount of rotation of compression piston actuator 52 is measured by counting the passage of index marks 62 traversed by pin 58. The revolutions and fraction of revolutions are recorded as NTt.

Then for the case of ideal gas behavior, the volume of total free gas is calculated by $$V1t = P2t/(P2t-P1t)*Ap*NTt/TPI \quad (2)$$

Where:
- V1t is volume of entrained gas at the starting pressure P1e
- P1t is the starting pressure (absolute).
- P2t is the ending pressure (absolute).
- Ap is the surface area of compression piston 43. (in$^2$)
- NTt is the number of turns of compression piston actuator 52.
- TPI is the number of threads per inch of compression piston threads 43B.

The volume of dissolved gas that was removed by the application of vacuum is the difference between the total volume of free gas, Vt, and the entrained gas previously measured, Ve, after first normalizing the volumes to a common reference pressure.

It will be apparent to those skilled in the art that the all of the dissolved gas is not removed from the liquid at pressure P_REF. That is, if the test were to yield a pressure less than P_REF, then still additional dissolved gas would be removed. The total amount of gas which is dissolved is a function of the pressure in the process from which the liquid sample was received and the partial pressures of the gas and liquid components at the temperature of the liquid. Using the data obtained with the operation of the apparatus, general relationships that predict the amount of gas dissolved at other values for P_REF, temperature, and fluid composition can be developed. Such calculations may include, for example, converting the volume of freed dissolved gas to mols of freed dissolved gas, taking into account the partial pressures of the gas and liquid components at the temperature of the test, and using a gas law such as Henrys Law to estimate the amount of gas dissolved at various other pressures and temperatures. Such calculations can be completed by those skilled in the art and do not affect the use of the present apparatus and method.

Many variations that have not been described in the detailed description still remain within the spirit of the invention. These variations should be included in the scope of the invention if they are encompassed within the following claims.

What is claimed is:

1. An apparatus for measuring dissolved and entrained gas in a liquid, the apparatus comprising:
   a housing comprising a vacuum cylinder and a sample cylinder, wherein the diameter of said vacuum cylinder is greater than the diameter of said sample cylinder and the vacuum cylinder and said sample cylinder are conterminal, proximally connected, and axially aligned cylindrical chambers;
   a housing base attached at a distal end of said housing;
   a top isolation valve positioned at a distal end of said sample cylinder;
   a bottom isolation valve positioned at a proximal end of said sample cylinder;
   a pressure transducer mounted to measure pressure in said sample cylinder;

a compression piston of diameter equal to or less than the diameter of said sample cylinder and radially positioned within a vacuum piston in a liquid-sealed arrangement;

said vacuum piston positioned within said vacuum cylinder in a liquid-sealed arrangement;

a proximal surface of said vacuum piston being a conical surface;

an arched proximal surface of said vacuum cylinder shaped to match said conical surface of said vacuum piston;

a first actuating means coupled to said vacuum piston to translate said vacuum piston within said vacuum cylinder;

a directional seal means comprising a directional seal mounted in a directional seal groove in the proximal end of said vacuum piston, wherein:

a) an axial center of said directional seal groove coincides radially within an axial center of said vacuum piston;

b) a cross section of said directional seal groove is of a trapezoidal shape;

c) a directional seal surface is defined by a proximal intersection of said vacuum cylinder and said sample cylinder;

d) contact of said directional seal with said directional seal surface provides a sealing arrangement at the proximal end of said sample cylinder when said vacuum piston is extended to be in contact with the proximal end of said vacuum cylinder;

e) a seal peak exists on said directional seal at the maximum extension of said directional seal out of said directional seal groove; and f) a circular diameter of said seal peak of said directional seal is less than the diameter of said directional seal surface;

wherein in operation when said vacuum piston is extended such that said directional seal narrowly contacts said directional seal surface, the locus of said seal peak being positioned within the outside surface of said sample cylinder results in a failed seal such that liquid within said vacuum cylinder passes largely unrestricted into said sample cylinder, whereas with further extension of said vacuum piston a substantial seal forms at the proximal end of said sample cylinder preventing liquid passage from said sample cylinder into said vacuum cylinder when pressure is applied to said sample cylinder;

a second actuating means coupled to said compression piston to translate said compression piston linearly within said vacuum piston; and a position measuring means to measure the linear travel of said compression piston.

2. The apparatus of claim 1, wherein a cross-sectional area of said vacuum cylinder divided by a cross-sectional area of said sample cylinder is 25.

3. The apparatus of claim 1, wherein the diameter of said first cylinder is 76 mm and the diameter of said second cylinder is 15 mm.

4. The apparatus of claim 1, wherein said conical surface is sloped at 0.067.

5. The apparatus of claim 1, wherein said first actuating means comprises:

a. a vacuum piston actuator coupled to said vacuum piston by a bearing and a bearing holder, the bearing being pressed onto said vacuum piston actuator, the bearing holder being connected to the distal end of said vacuum piston;

b. threads on said vacuum piston actuator, and mating threads on said housing base; and c. a pin fixedly installed in said bearing holder and slidably positioned in a slot in said housing preventing rotation of said vacuum piston;

wherein rotation of said vacuum piston actuator serves to linearly translate said vacuum piston within said vacuum cylinder.

6. The apparatus of claim 1, wherein said second actuating means comprises:

a. a compression piston actuator coupled to said compression piston by means of compression piston threads and mating actuator threads;

b. a vacuum piston actuator base fixedly attached to the distal end of said vacuum piston actuator;

c. an assembly of said compression piston and said compression piston actuator slidably positioned within said vacuum piston actuator base;

d. a rotation pin installed into said vacuum piston actuator base in an orientation perpendicular to an axis of said vacuum piston actuator base, and moveable into or retracted from a circumferential slot in said compression piston actuator; and e. a limit pin placed in said vacuum piston slidably positioned in a longitudinal slot in a side of said compression piston and fixedly installed in said vacuum piston to prevent rotation and limit axial travel of said compression piston;

wherein rotation of said compression piston actuator causes linear translation of said compression piston relative to said vacuum piston actuator.

7. The apparatus of claim 1, wherein said position measuring means comprises:

a. an index wheel with regularly-spaced index marks around the circumference therewith, said index wheel rigidly attached to the distal end of said compression piston; and b. an index pin attached to the perimeter of said compression piston actuator, and positioned radially at a distance from an axis of said compression position actuator such that said index pin passes closely over the outside surface of said index disc.

8. The apparatus of claim 1, wherein said directional seal means comprises:

a. an o-ring of size –111, 50 d, buna rubber for said directional seal;

b. a diameter of 15.3 mm for said directional seal surface;

c. a square corner for said directional seal surface;

d. a diameter of 14.2 mm for said seal peak;

e. said directional seal groove width of 3.00 mm and a depth of 2.08 mm machined using International Tool P/N 53-4010.

* * * * *